United States Patent
Larsson

(10) Patent No.: US 11,402,298 B2
(45) Date of Patent: Aug. 2, 2022

(54) DEVICE FOR DETECTING A DEFECT OF A ROTATING ARRANGEMENT

(71) Applicant: Aktiebolaget SKF, Gothenburg (SE)

(72) Inventor: Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/930,759

(22) Filed: May 13, 2020

(65) Prior Publication Data
US 2021/0003476 A1    Jan. 7, 2021

(30) Foreign Application Priority Data

Jul. 1, 2019   (DE) .......................... 102019209606.9

(51) Int. Cl.
*G01M 13/04*   (2019.01)

(52) U.S. Cl.
CPC .................................. *G01M 13/04* (2013.01)

(58) Field of Classification Search
CPC .................................................... G01M 13/04
See application file for complete search history.

(56) References Cited

U.S. PATENT DOCUMENTS

| | | | |
|---|---|---|---|
| 2003/0065409 A1 | 4/2003 | Raeth et al. | |
| 2016/0305845 A1* | 10/2016 | van der Ham | F16C 41/008 |
| 2017/0102036 A1* | 4/2017 | Hebrard | F16C 33/44 |
| 2017/0108406 A1* | 4/2017 | Thomson | G01H 1/00 |
| 2017/0183016 A1* | 6/2017 | Shah | B61C 17/00 |
| 2017/0270770 A1* | 9/2017 | Marshall | F16C 19/52 |
| 2018/0370280 A1* | 12/2018 | Akbarian | G01K 3/005 |
| 2019/0101103 A1 | 4/2019 | Haseba et al. | |
| 2019/0301975 A1* | 10/2019 | Sugiura | F16C 19/52 |
| 2019/0332102 A1 | 10/2019 | Larsson | |
| 2020/0142392 A1* | 5/2020 | Prabhu | G01M 13/04 |
| 2020/0225628 A1* | 7/2020 | Larsson | G06N 5/04 |
| 2020/0382036 A1* | 12/2020 | Shiiya | F16C 41/00 |
| 2021/0003477 A1* | 1/2021 | Larsson | G06F 17/18 |

* cited by examiner

*Primary Examiner* — Eric S. McCall
(74) *Attorney, Agent, or Firm* — Garcia-Zamor Intellectual Property Law; Ruy Garcia-Zamor; Bryan Peckjian

(57) ABSTRACT

A device for detecting a defect of a rotating arrangement is disclosed. The rotating arrangement provides one or more rotating elements or groups of rotating elements. The device includes a definition unit for defining a dynamic threshold based on a static threshold of an actually monitored rotating element or group of rotating elements and based on a mean value of static thresholds of a plurality of similar functioning rotating elements or groups of rotating elements, and a detection unit for detecting a defect by comparing a current parameter value of the actually monitored rotating element or group of rotating elements with the dynamic threshold. Also, a method for detecting a defect of a rotating arrangement is disclosed.

8 Claims, 1 Drawing Sheet

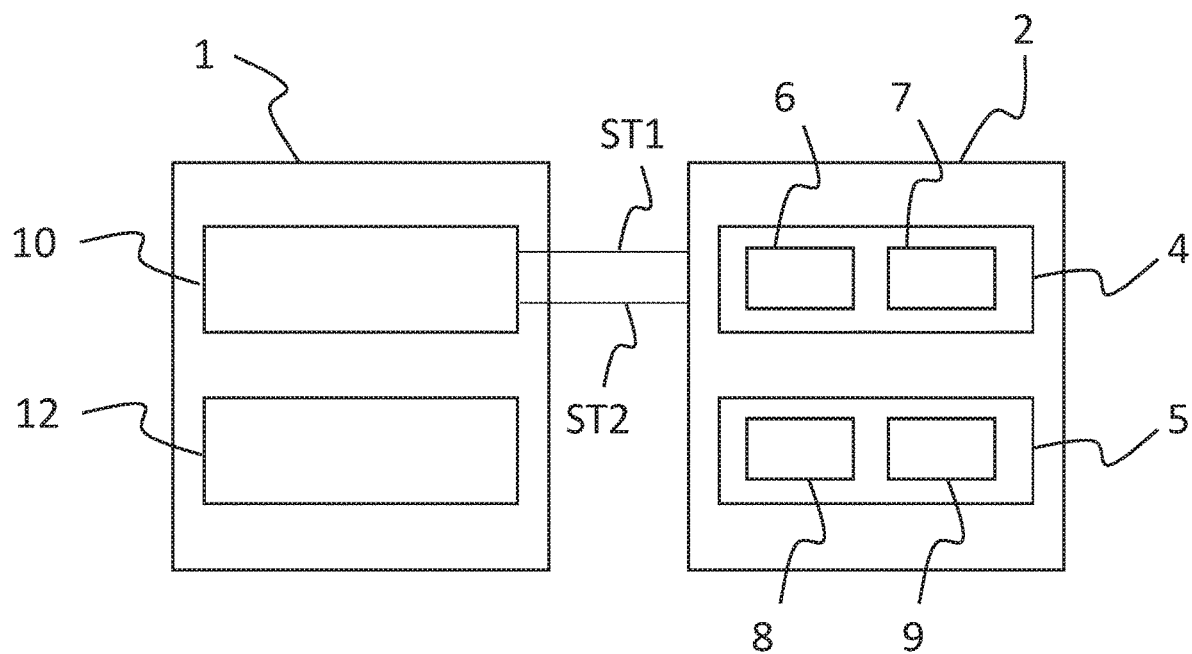

DEVICE FOR DETECTING A DEFECT OF A ROTATING ARRANGEMENT

CROSS-REFERENCE TO RELATED APPLICATIONS

This application claims priority to German Patent Application no. 102019209606.9, filed Jul. 1, 2019, the contents of which is fully incorporated herein by reference.

FIELD OF THE INVENTION

The present invention relates to a device for detecting a defect of a rotating arrangement and to a method for detecting a defect of a rotating arrangement.

BACKGROUND OF THE INVENTION

In a rotating arrangement, which includes one or more rotating elements or groups of rotating elements, it is necessary to monitor the rotating elements to detect defects or failures of these elements. The rotating elements may be for example a bearing or parts of a bearing like a bearing ring, a cage or rolling elements. Defects of the rotating elements may lead to a failure of the complete rotating arrangement, which should be avoided. Today, the methods and devices for detecting such defects include a monitoring of the rotating elements after installation in the rotating arrangement. Thus, it may be detected whether a new defect occurs. However, if an already faulty rotating element is installed, defects may go undetected for a longer time than necessary.

It is thus an object of the present invention to provide an improved device and method for detecting a defect of a rotating arrangement which can detect also defects being already present at the time of installation. This object is solved by a device for detecting a defect of a rotating arrangement with one or more rotating elements or groups of rotating elements.

SUMMARY OF THE INVENTION

With respect to the present invention, a rotating arrangement may be any kind of rotating machine. The rotating elements may be for example a bearing or component of a bearing like a bearing ring, a rolling element, a cage or a seal. The group of rotating elements may be a group of multiple bearings of the same kind or a group of bearing components of the same kind. The rotating elements may also be any other kind of rotating device. The rotating arrangement may comprise multiple rotating elements or multiple groups of rotating elements, which can be physically arranged within one arrangement or can be virtually associated with one arrangement and be physically arranged remotely to each other, for example in a plant or factory.

Each of the rotating elements or groups of rotating elements has different parameters which can be monitored. In order to detect deviations within these parameters, static thresholds are assigned to the rotating elements or groups of rotating elements and the corresponding parameters. However, these thresholds are static and are set only considering the status quo of the rotating elements or groups of rotating elements. If the rotating elements or groups of rotating elements already have damages, these damages contribute to the static threshold and can therefore not be detected.

In order to detect also such damages being already present at the time of installation, the device for detecting a defect of a rotating arrangement comprises a definition unit for defining a dynamic threshold based on a static threshold of an actually monitored rotating element or group of rotating elements and based on a mean value of static thresholds of a plurality of similar functioning rotating elements or groups of rotating elements of the same rotating arrangement or one or more different rotating arrangements. When the dynamic threshold for the actually monitored rotating element or group of rotating elements is defined, a detection unit of the device may detect a defect by comparing a current parameter value of the actually monitored rotating element or group of rotating elements with the dynamic threshold.

When there is no damage, the static threshold of the actually monitored rotating element or group of rotating elements and the static thresholds of the plurality of similar functioning rotating elements or groups of rotating elements should be substantially equal. In contrast to this, when there is a damage, the static threshold of the actually monitored rotating element or group of rotating elements and the static thresholds of the plurality of similar functioning rotating elements or groups of rotating elements will differ from each other.

Thus, as the dynamic threshold is defined based on a combination of these static thresholds and thus based on a combination of non-faulty and possibly faulty elements, also defects, which were already present before the installation of the corresponding rotating element or group of rotating elements, may be detected. Thus, an earlier and precise detection of defects may be achieved.

The thresholds, i.e. the static threshold of the actually monitored rotating element or group of rotating elements and the mean value of the static thresholds of the plurality of similar functioning rotating elements or groups of rotating elements, may be differently weighted. For example, the mean value of the static thresholds may have a first weighting factor and the static threshold may have a second weighting factor. Preferably, the first weighting factor and the second weighting factor are dependent on each other.

According to a further embodiment, the dynamic threshold is defined according to the following equation:

$$DynTL = CF*MeanTL + (1-CF)*TL, \text{ with } 0 \leq CF \leq 1.$$

In this case, DynTL is the dynamic threshold, MeanTL is the mean value of the static thresholds, TL is the static threshold, CF is the first weighting factor and (1−CF) is the second weighting factor. The thresholds may also be weighted differently so that the mean value of the static thresholds and the static threshold contribute in different amounts to the dynamic threshold.

According to a further aspect, a method for detecting a defect of a rotating arrangement is provided. The method comprises the following steps: defining a dynamic threshold based on a static threshold of an actually monitored rotating element or group of rotating elements and based on a mean value of static thresholds of a plurality of similar functioning rotating elements or groups of rotating elements, and detecting a defect by comparing a current parameter value of the actually monitored rotating element or group of rotating elements with the dynamic threshold.

The embodiments and features described with reference to the device of the present invention apply mutatis mutandis to the method of the present invention.

According to a further aspect, the invention relates to a computer program product comprising a program code for executing the above-described method when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further advantages and preferred embodiments are disclosed in the claims, the description and the figures. It should be further noted that a person skilled in the art may regard or use the presented features individually or combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

FIG. 1 shows a schematic block diagram of a device for detecting a defect of a rotating arrangement.

In the following same or similar functioning elements are indicated with the same reference numerals.

DETAILED DESCRIPTION OF THE INVENTION

FIG. 1 shows a device 1 for detecting a defect of a rotating arrangement 2. The rotating arrangement 2 may be any kind of rotating arrangement comprising multiple rotating elements 6, 7, 8, 9 of the same kind or multiple groups 4, 5 of rotating elements 6, 7, 8, 9 of the same kind. In the embodiment of FIG. 1, the rotating arrangement 2 comprises two groups 4, 5, which may be for example bearings, wherein each group 4, 5 has two rotating elements 6, 7, 8, 9, which may be for example a bearing ring, a rolling element, a cage or a seal of the bearing.

The device 1 may be used for detecting a defect of at least one of the rotating elements 6, 7, 8, 9 or a group 4, 5 of the rotating elements 6, 7, 8, 9. For this purpose, the device 1 comprises a definition unit 10 for defining a dynamic threshold for an actually monitored rotating element 6, 7, 8, 9 or group 4, 5 of the rotating elements 6, 7, 8, 9. In the following, as an example, the group 4 with the rotating elements 6, 7 will be monitored.

The definition unit 10 uses a static threshold ST1 from the group 4. The static threshold can be determined by one the following: (1) it can be provided by a manufacturer, (2) it can be based on prior experience during operation of the actually monitored rotating element or group of rotating elements, and (3) it can be provided by data from the International Organization for Standardization. This static threshold ST1 is set within the group 4 without considering any damages which are already present. In order to be able to also detect such damages, the definition unit 10 defines a dynamic threshold for the group 4 using a combination of the static threshold ST1 of the group 4 as well as a mean value of the static thresholds ST1, ST2 of multiple groups 4, 5 which function in a similar way. In this case, the dynamic threshold will be defined using the static threshold ST1 of the group 4 and a mean value of the static threshold ST1 of the group 4 and the static threshold ST2 of the group 5. The mean value of the thresholds ST1 and ST2 and the static threshold ST1 may be differently weighted, contributing in variable fractions to the dynamic threshold. The weighting factors may be set according to the knowledge of a user or according to historical experiences.

When the dynamic threshold is set, a detection unit 12 is able to detect a defect of the group 4 and thus of the whole rotating arrangement 2 by comparing a current parameter value of the group 4 with the dynamic threshold. If the current value of the monitored group 4 exceeds or goes below the dynamic threshold, a defect may have occurred.

Thus, by providing a device for detecting a defect of a rotating arrangement, which uses a dynamic threshold being defined using a combination of static thresholds of similar functioning parts of the rotating arrangement, an improved detection of defects is possible. In particular, less false alarms and an earlier detection of defects which have already been present during installation of the rotating arrangement may be achieved.

The invention claimed is:

1. A device for detecting a defect of a rotating arrangement, the device comprising:
   one or more rotating elements or groups of rotating elements,
   a definition unit for defining a dynamic threshold based on a static threshold of an actually monitored rotating element or group of rotating elements and based on a mean value of the static threshold of the actually monitored rotating element or group of rotating elements and a plurality of static thresholds of similar functioning rotating elements or groups of rotating elements, and
   a detection unit for detecting a defect by comparing a current parameter value of the actually monitored rotating element or group of rotating elements with the dynamic threshold.

2. The device according to claim 1, wherein the mean value of the static thresholds has a first weighting factor, and wherein the static threshold has a second weighting factor.

3. The device according to claim 2, wherein the first weighting factor and the second weighting factor are dependent on each other.

4. The device according to claim 3, wherein the dynamic threshold is defined according to: $DynTL = CF*MeanTL \pm (1-CF)*TL$, with $0 \leq CF \leq 1$, wherein DynTL is the dynamic threshold, MeanTL is the mean value of the static thresholds of the plurality of similar functioning rotating elements or groups of rotating elements, TL is the static threshold of the actually monitored rotating element or group of rotating elements, CF is the first weighting factor and 1−CF is the second weighting factor.

5. The device according to claim 1, wherein the rotating element is a bearing or a component of a bearing selected from the group consisting of a bearing ring, a cage, a rolling element or a seal.

6. The device according to claim 5, wherein a group of rotating elements is a group of multiple bearings of the same kind or a group of bearing components of the same kind.

7. A method for detecting a defect of a rotating arrangement, the method comprising the steps of:
   providing one or more rotating elements or groups of rotating elements,
   defining a dynamic threshold based on a static threshold of an actually monitored rotating element or group of rotating elements and based on a mean value of the static threshold of the actually monitored rotating element or group of rotating elements and a plurality of static thresholds of similar functioning rotating elements or groups of rotating elements, and
   detecting a defect by comparing a current parameter value of the actually monitored rotating element or group of rotating elements with the dynamic threshold.

8. A device for detecting a defect of a rotating arrangement, the device comprising:
- one or more rotating elements or groups of rotating elements,
- a definition unit for defining a dynamic threshold based on a static threshold of an actually monitored rotating element or group of rotating elements and based on a mean value of the static threshold of the actually monitored rotating element or group of rotating elements and a plurality of static thresholds of similar functioning rotating elements or groups of rotating elements, the static threshold being determined by one of the group of: (1) provided by a manufacturer, (2) based on prior experience during operation of the actually monitored rotating element or group of rotating elements, and (3) provided by data from the International Organization for Standardization, and
- a detection unit for detecting a defect by comparing a current parameter value of the actually monitored rotating element or group of rotating elements with the dynamic threshold.

\* \* \* \* \*